(12) United States Patent
Ding et al.

(10) Patent No.: US 7,206,172 B2
(45) Date of Patent: Apr. 17, 2007

(54) ELECTRICAL LAPPING GUIDE EMBEDDED IN A SHIELD OF A MAGNETIC HEAD

(75) Inventors: Meng Ding, Mountain View, CA (US); Huey-Ming Tzeng, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 361 days.

(21) Appl. No.: 10/783,290

(22) Filed: Feb. 20, 2004

(65) Prior Publication Data
US 2005/0185345 A1 Aug. 25, 2005

(51) Int. Cl.
 G11B 5/39 (2006.01)
 B24B 49/00 (2006.01)
 B24B 51/00 (2006.01)

(52) U.S. Cl. .............. 360/316; 451/5; 451/1; 29/603.09

(58) Field of Classification Search .......... 29/593, 29/603.09, 603.16; 451/1, 5, 8, 9, 28; 360/316, 360/313, 319
See application file for complete search history.

(56) References Cited

U.S. PATENT DOCUMENTS

| | | | | |
|---|---|---|---|---|
| 5,210,667 A * | 5/1993 | Zammit | ............. | 360/316 |
| 5,772,493 A | 6/1998 | Rottmayer et al. | ........... | 451/5 |
| 6,083,081 A | 7/2000 | Fukuroi et al. | ................ | 451/5 |
| 6,219,205 B1 | 4/2001 | Yuan et al. | ................. | 360/319 |
| 6,399,148 B2 | 6/2002 | Fukuroi et al. | ............ | 427/131 |
| 6,510,030 B1 | 1/2003 | Song et al. | ................. | 360/319 |
| 6,609,948 B1 | 8/2003 | Fontana, Jr. et al. | ............ | 451/5 |
| 6,758,722 B2 * | 7/2004 | Zhu | ............................. | 451/5 |
| 6,935,923 B2 * | 8/2005 | Burbank et al. | ............... | 451/5 |
| 7,062,838 B2 * | 6/2006 | Ding et al. | ............. | 29/603.12 |
| 2002/0012204 A1 | 1/2002 | Boutaghou et al. | ......... | 360/316 |
| 2002/0173227 A1 * | 11/2002 | Lam et al. | ..................... | 451/5 |
| 2003/0020467 A1 | 1/2003 | Kasahara et al. | ...... | 324/207.21 |
| 2005/0063103 A1 * | 3/2005 | Ding et al. | ................ | 360/324 |

FOREIGN PATENT DOCUMENTS

| | | | |
|---|---|---|---|
| JP | 197435649 | | 11/1975 |
| JP | 62012913 A | * | 1/1987 |
| JP | 62099911 | | 5/1987 |
| JP | 6338033 | | 12/1994 |
| JP | 8235532 | | 9/1996 |
| JP | 9016912 | | 1/1997 |
| JP | 9081917 | | 3/1997 |
| JP | 9147323 | | 6/1997 |
| JP | 11353624 | | 12/1999 |
| JP | 2001014617 A | * | 1/2001 |
| JP | 2001160204 | | 6/2001 |

OTHER PUBLICATIONS

"Electrostatic Shielding for Magnetoresistive Read Heads", IBM Technical Disclosure Bulletin, Apr. 1979.

* cited by examiner

*Primary Examiner*—William J Klimowicz
(74) *Attorney, Agent, or Firm*—Zilka-Kotab, PC

(57) ABSTRACT

An electrical lapping guide (ELG) incorporated into a shield of a magnetic head for measuring lapping process during construction of the magnetic head.

9 Claims, 10 Drawing Sheets

ELECTRICAL LAPPING GUIDE EMBEDDED IN A SHIELD OF A MAGNETIC HEAD

FIELD OF THE INVENTION

The present invention relates to the manufacture of magnetic heads and more particularly to the manufacture of a magnetoresistive head having a lapping guide embedded therein to accurately determine lapping depth.

BACKGROUND OF THE INVENTION

Modern computer systems require large amounts of non-volatile, inexpensive data storage. Typically the best candidate for such storage has been magnetic disk drive systems. A disk drive stores data in the form of magnetic transitions representing bits of data. The magnetic transitions form concentric tracks of data on the surface of a magnetic disk. These tracks of data are written onto the disk and read from the disk by a magnetic head incorporated on a slider. The read head usually includes a read element such as a giant magnetoresistive sensor (GMR), although various other sensors such as tunneling magnetoresistance sensors (TMR) have also been investigated. This read element is disposed between a pair of shields, constructed of a soft magnetic material, which acts to prevent the detection of stray magnetic fields. The head also includes an inductive write element. Details of the construction of read and write elements will be discussed in greater detail below. The slider is attached to a suspension and to an actuator that moves the slider over the disk to read and write the various tracks of data on the disk. As the disk spins, air immediately adjacent to the disk move with it due to viscous forces, allowing the slider to fly over the disk on a very small cushion of air. The surface of the slider immediately adjacent to the disk, referred to as an air bearing surface (ABS), has a shape which facilitates the slider's flight over the surface of the disk by regulating air pressure at various point under the slider. The magnetic heads generally are disposed at the trailing edge of the slider, extending toward the air bearing surface.

Sliders are manufactured on wafers, with many thousands of sliders being produced on a single wafer. The read and write element of each slider is formed on top of the wafer using various material deposition and photolithographic processes that will be familiar to those skilled in the art. With reference to FIG. 1, the wafer is sliced into rows 100 each containing many sliders. This level of the manufacturing process is generally referred to as the "row level". It is at this level of manufacture that the (ABS) 102 is generally formed. The side of the row 102 that is to become the ABS of the various sliders is carefully lapped to remove a desired amount of material. The amount of material removed must be carefully controlled, because it will ultimately determine the stripe height of the sensor, (ie the distance from the ABS edge of the sensor to the back edge of the sensor. Careful control of stripe height is critical to sensor performance. After the lapping process has been completed, the row is sliced into individual sliders as indicated by dashed lines in FIG. 1.

With reference to FIG. 2, which illustrates a top down view of a row at read element level, prior art ELGs 201 have been incorporated along side read elements 203 in a row 205. Removal of material from the ELG 201 during lapping increases the resistance of the ELG 201. By measuring this resistance change an operator can determine the proper point at which to cease lapping. As can be seen, such a method of monitoring lapping takes up valuable space on the row 205. This space could otherwise incorporate sliders, which would greatly increase the number of sliders formed on a given wafer. It will be appreciated by those skilled in the art that a write element (not shown) would typically be constructed above the read sensor and the row would be sliced into sliders as previously discussed.

In an alternate form of sensor, termed a recessed sensor, the sensor is recessed a predetermined distance from the ABS. This can be advantageous in that the lapping process does not lead to smearing of the sensor. When manufacturing a recessed sensor, the lapping process does not determine the stripe height, as this is defined earlier by lithographic processes. However, careful control of the lapping process remains critical because it determines the distance from the ABS to the sensor and therefore, determines the sensitivity with which the sensor can detect magnetic fields. In other words, the lapping process must remove enough material so that the sensor is not too far from the ABS (less than 10 nanometers), but cannot remove so much material that the sensor is exposed.

FIG. 3 describes a prior art method, also disclosed in co-pending, commonly assigned patent application Ser. No. 10/666,679 filed Sep. 19, 2003, for monitoring the amount of material removed during a lapping operation. This method has been proposed for constructing a recessed sensor. FIG. 3 depicts a cross section of a slider during the lapping process. The row level 301 of the wafer is formed with a conductive portion 303, formed of the same material as the sensor 305. The conductive portion 303 and sensor portion 305 are separated by a non-conductive material 307, which can be for example alumina. The non-conductive portion 307 can be formed by removal of sensor material and refilling with non-conductive material. As the slider is lapped, the resistance of the conductive portion 303 is measured. When the conductive portion 303 has been completely removed, the resistance increases essentially infinitely. When this increase in resistance is detected, the lapping process is stopped and a second method of lapping control is employed. With the resistive lapping guide 303 removed further lapping monitoring requires applying a magnetic field and measuring the increase in GMR as lapping progresses. As will be appreciated by those skilled in the art, such a technique for monitoring further lapping progress can be time consuming and difficult to control.

Therefore, there remains a need for an ELG that can allow lapping to be accurately monitored in either a recessed or exposed sensor design. Such a method would preferably utilize already existing processing steps rather than adding process complexity. Further such a technique would not occupy valuable wafer area, which could otherwise contain sliders.

SUMMARY OF THE INVENTION

The present invention provides an electric lapping guide, embedded in a shield of a read head, for accurately monitoring lapping of a magnetic head. The lapping guide of the present invention advantageously allows for very accurate lapping control, without requiring additional process steps in the manufacture of the magnetic head. The invention includes the formation of a magnetoresistive sensor and the formation of a layer of magnetic, electrically conductive material either above or below the sensor (ie. formed either before or after the sensor). A gap formed in the magnetic, electrically conductive layer terminates at a point near where lapping is desired to be stopped and extends through a distal end of the magnetic, electrically conductive layer opposite the edge where lapping will take place. First and second leads are attached to the magnetic, electrically conductive layer at opposite sides of the gap. While lapping takes place, the leads are used to measure the resistance across the magnetic, electrically conductive layer. When lapping reaches the gap, the resistance will increase dramatically indicating that lapping should cease.

A magnetic head manufactured according to the present invention includes a sensor and first and second, coplanar magnetic, electrically conductive layers formed proximal to the sensor. The first and second magnetic, electrically conductive layers can be separated from one another by a dielectric material and can be formed either above or below the sensor. At least one of the first and second magnetic layers can function as a magnetic shield. First and second electrical leads can be connected electrically with the first and second electrically conductive layers.

The manufacture of a magnetic head may include the formation of a magnetic, electrically conductive material having two or more gaps formed therein. In such case first and second leads may be connected with the magnetic, electrically conductive material at opposite sides of the gaps and each lead may be in electrical communication with both the magnetic, electrically conductive layer and the sensor. When lapping proceeds to at least one of the gaps, the electrical resistance increases dramatically indicating that lapping should cease. Further lapping will further increase the resistance, and should further lapping be desired, such as to remove sensor material, the further increased resistance can be monitored to determine a proper point at which to cease lapping.

The present invention advantageously allows one of the shields of a sensor to be used as a lapping guide and allows the lap stop indication to be at any desired location on the magnetic head. By using the shield as an ELG, very few additional processing steps are required over those already necessary to construct the read head. In addition, since the ELG is incorporated into the head itself, no ELG is required to be separately located in row of a wafer, thereby saving valuable wafer real estate.

BRIEF DESCRIPTION OF THE FIGURES

For a fuller understanding of the nature and advantages of this invention, as well as the preferred mode of use, reference should be made to the following detailed description read in conjunction with the accompanying drawings which are not to scale.

DETAILED DESCRIPTION OF THE PREFERRED EMBODIMENTS

The following description is the best embodiment presently contemplated for carrying out this invention. This description is made for the purpose of illustrating the general principles of this invention and is not meant to limit the inventive concepts claimed herein.

Figure 1:
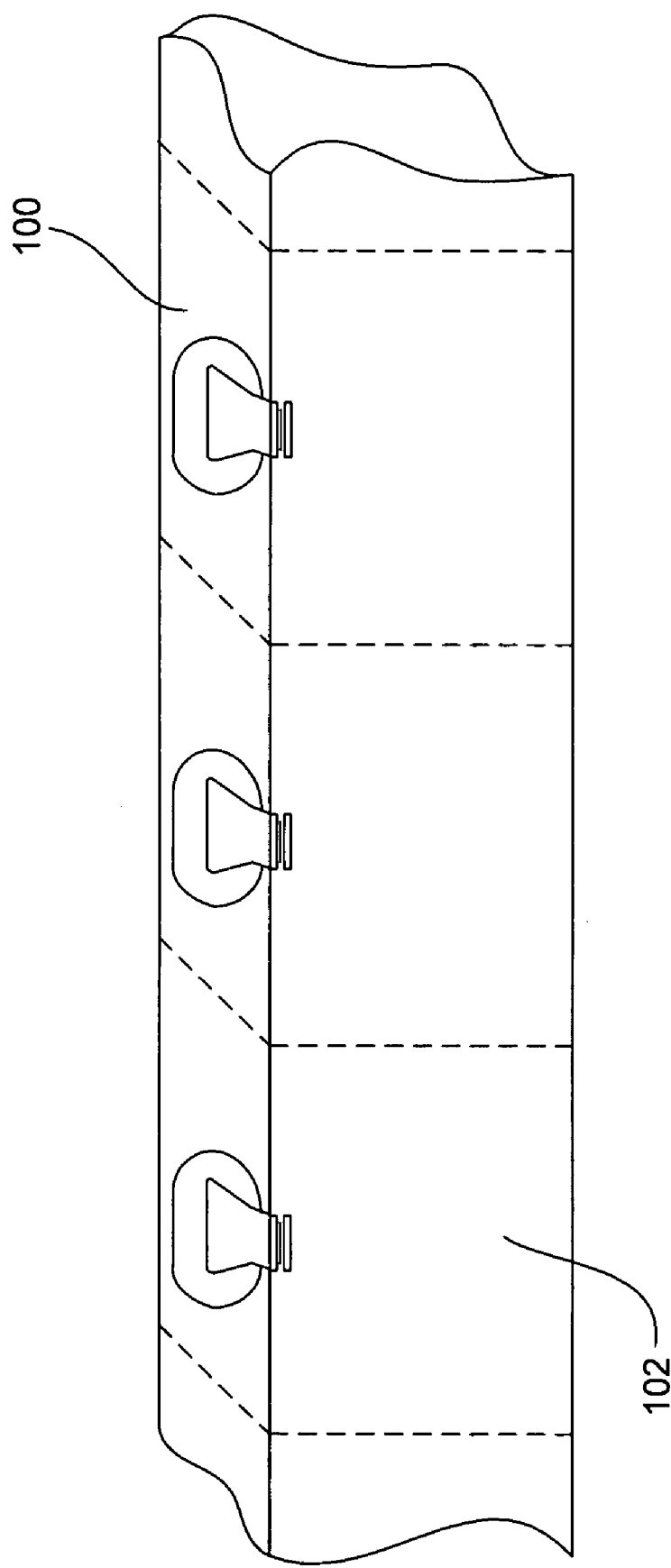
FIG. 1 is a partial perspective view of a row of sliders cut from a wafer as known in the prior art.
Figure 2:
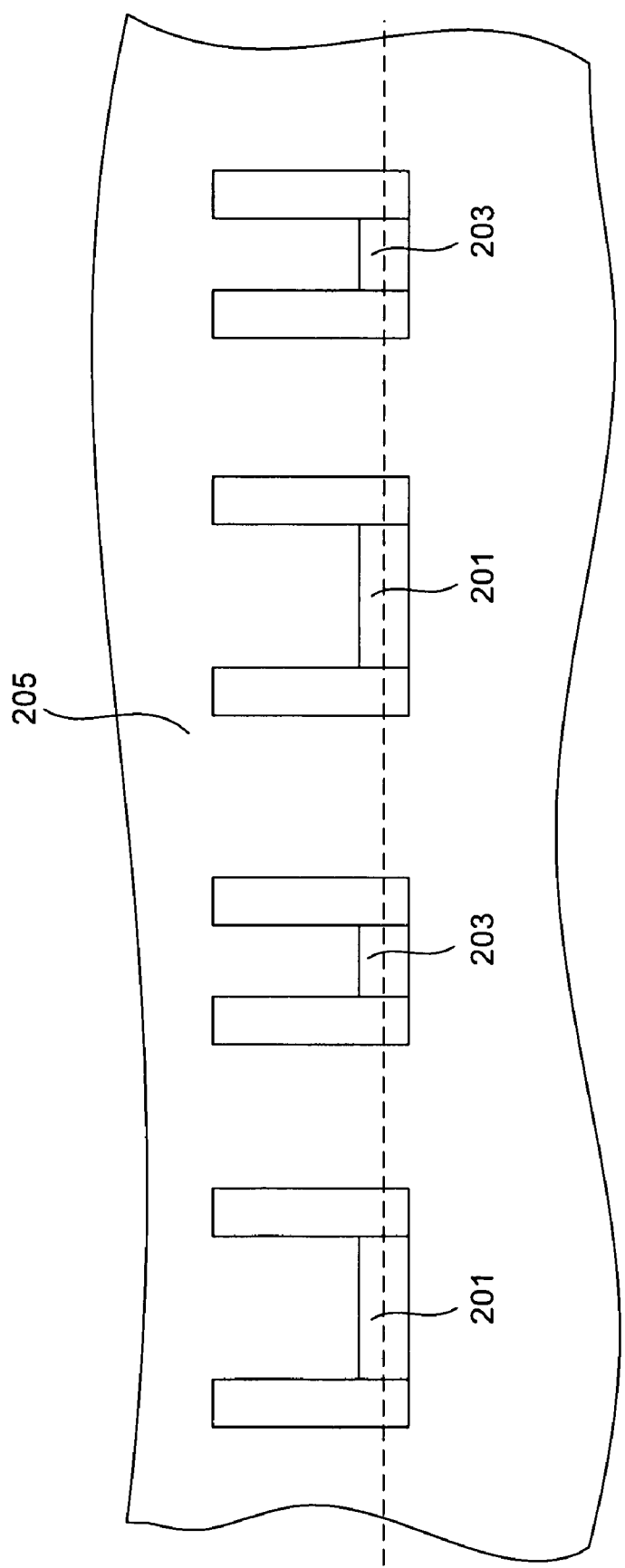
FIG. 2 is a plan view of a prior art row of sliders and lapping guides.
Figure 3:
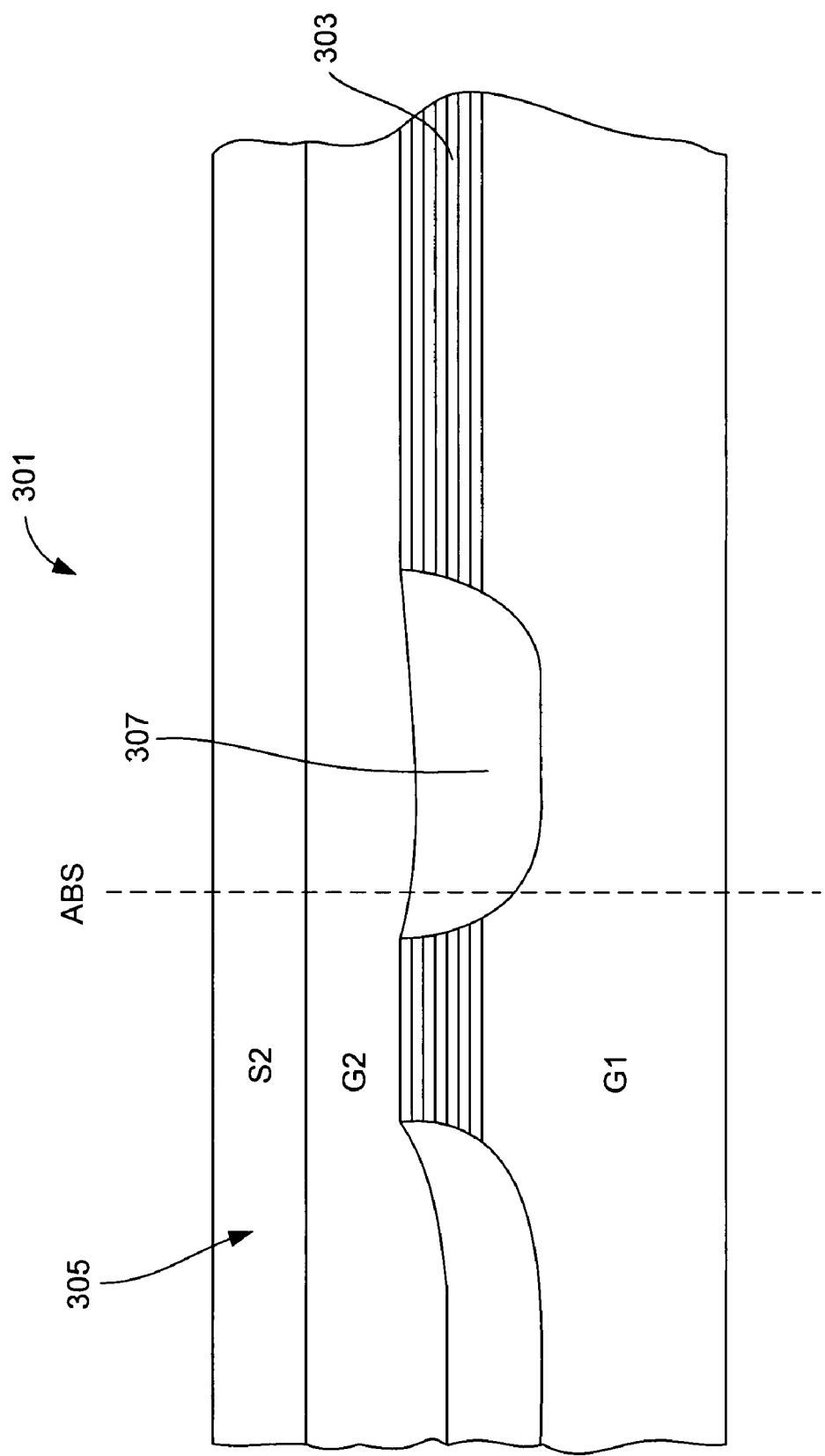
FIG. 3 is a cross sectional view depicting a prior art electronic lapping guide.
Figure 4:
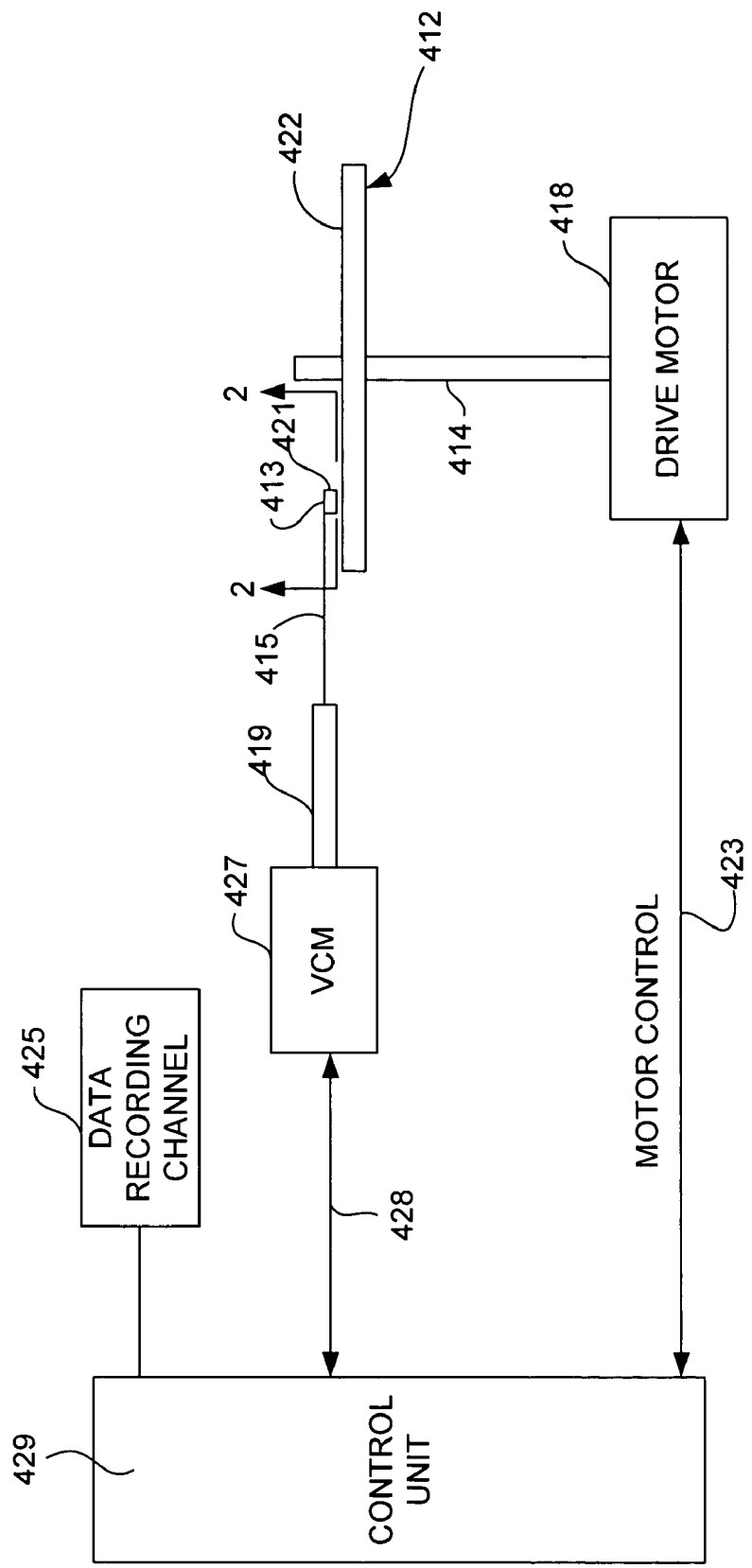
FIG. 4 is a simplified drawing of a magnetic recording disk drive system.

Referring now to FIG. 4, there is shown a disk drive 400 embodying this invention. As shown in FIG. 4, at least one rotatable magnetic disk 412 is supported on a spindle 414 and rotated by a disk drive motor 418. The magnetic recording on each disk is in the form of an annular pattern of concentric data tracks (not shown) on the magnetic disk 412.

At least one slider 413 is positioned near the magnetic disk 412, each slider 413 supporting one or more magnetic head assemblies 421. As the magnetic disk rotates, the slider 413 is moved radially in and out over the disk surface 422 so that the magnetic head assembly 421 may access different tracks of the magnetic disk where desired data are written. Each slider 413 is attached to an actuator arm 419 by way of a suspension 415. The suspension 415 provides a slight spring force, which biases slider 413 against the disk surface 422. Each actuator arm 419 is attached to an actuator means 427. The actuator means 427 as shown in FIG. 4 may be a voice coil motor (VCM). The VCM comprises a coil movable within a fixed magnetic field, the direction and speed of the coil movements being controlled by the motor current signals supplied by controller 429.

During operation of the disk storage system, the rotation of the magnetic disk 412 generates an air bearing between the slider 413 and the disk surface 422 which exerts an upward force or lift on the slider. The air bearing thus counter-balances the slight spring force of suspension 415 and supports slider 413 off and slightly above the disk surface by a small, substantially constant spacing during normal operation.

The various components of the disk storage system are controlled in operation by control signals generated by control unit 429, such as access control signals and internal clock signals. Typically, the control unit 429 comprises logic control circuits, storage means and a microprocessor. The control unit 429 generates control signals to control various system operations such as drive motor control signals on line 423 and head position and seek control signals on line 428. The control signals on line 428 provide the desired current profiles to optimally move and position slider 413 to the desired data track on disk 412. Write and read signals are communicated to and from write and read heads 421 by way of recording channel 425.

The above description of a typical magnetic disk storage system, and the accompanying illustration of FIG. 4 are for representation purposes only. It should be apparent that disk storage systems may contain a large number of disks and actuators, and each actuator may support a number of sliders.

Figure 5:
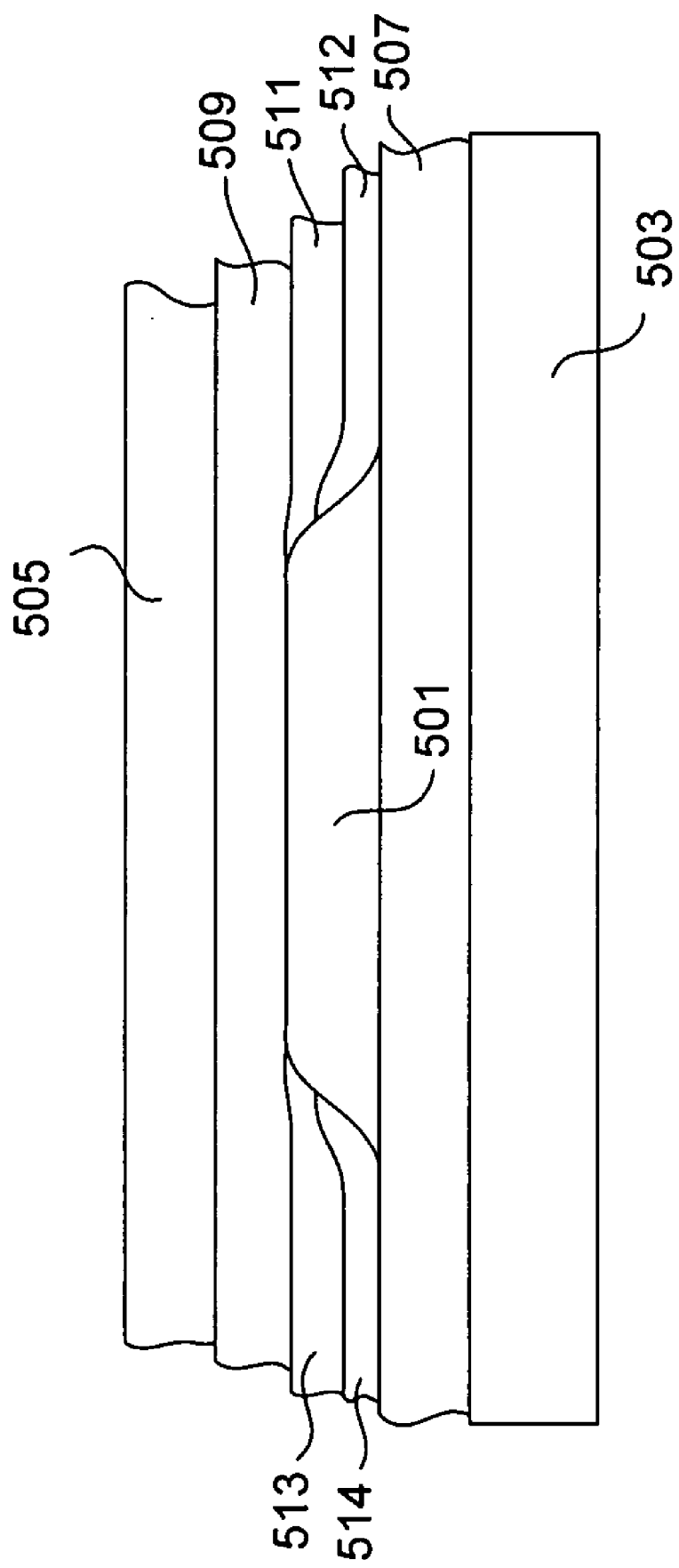
FIG. 5 is an ABS view of a read head.

FIG. 5 illustrates an ABS view of a read sensor 501 with portions removed for clarity. First and second magnetic shields 503, 505 are provided above and below the read sensor, and are separated from the read sensor by first and second gap layers 507, 509. The sensor can be for example a giant magnetoresistive (GMR) sensor, or could be some other type of sensor such as a Tunnel Magnetoresistive sensor (TMR), although a configuration of the invention using a TMR sensor is not shown. The first and second shields 503, 505 are constructed of a magnetically soft, electrically conductive material, and act to prevent the sensor from detecting stray fields. The gap layers 507, 509 are constructed of a non-magnetic, electrically insulating material such as for example alumina. First and second electrically conductive leads 511, 513 provide electrical connection to the sensor 501 for providing a sense current and detecting resistance changes in the sensor due to the presence of a magnetic field. The leads 511, 513 can be constructed many electrically conductive materials, such as Cu or Au. First and second hard bias layers 512, 514, constructed of a hard magenetic material, provide magnetic stabilization to the free layer of the sensor 501.

Figure 6:
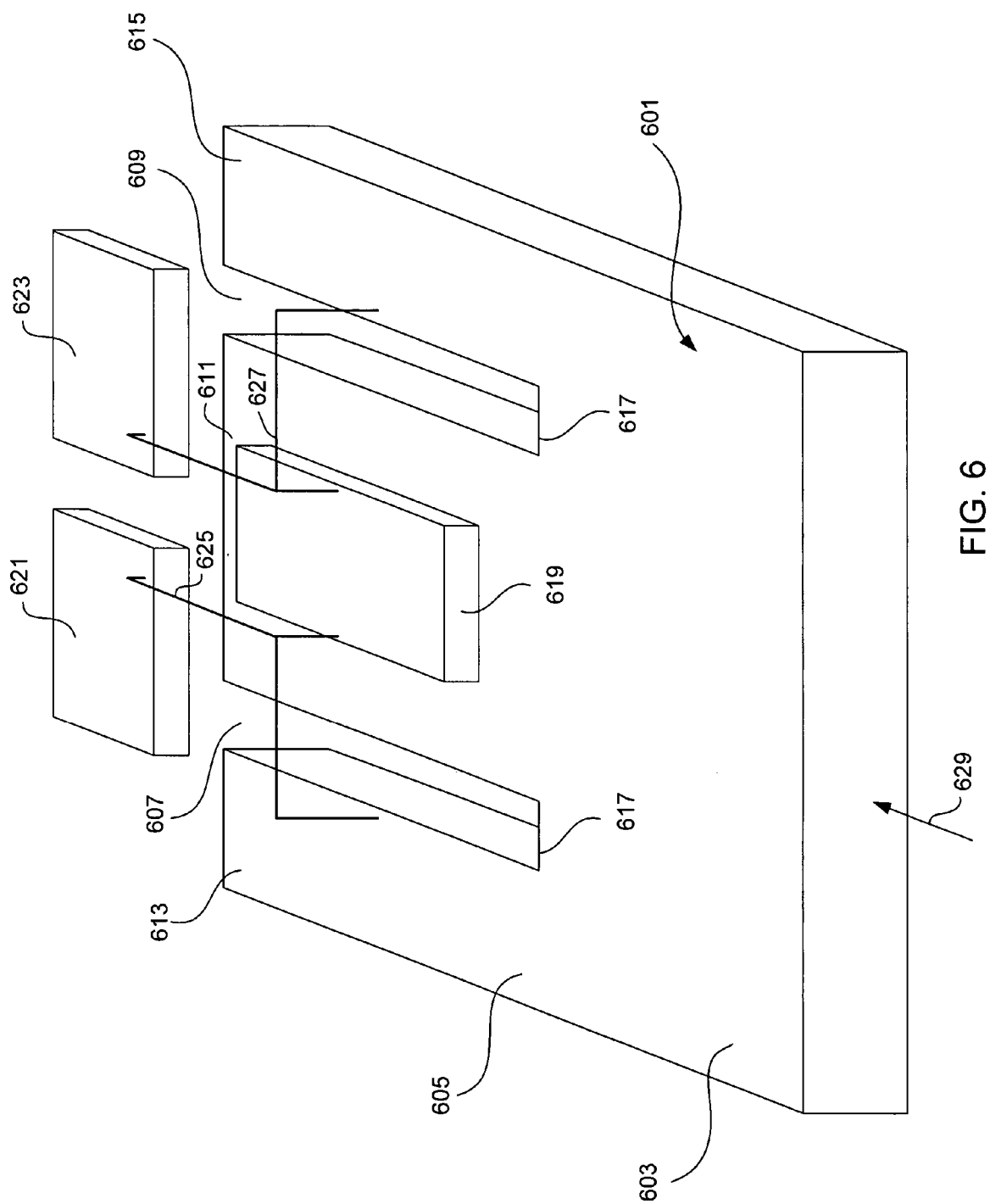
FIG. 6 is an exploded perspective, partial schematic view of an embedded ELG sensor according to an embodiment of the present invention.

FIG. 6, which represents an exploded perspective view, illustrates a method of utilizing an electric lapping guide ELG embedded within the shield of a sensor. Portions of the head structure have been omitted for clarity. A layer of shield material 601 serves as an ELG. The layer of shield material includes a contiguous portion 603, and a segmented portion 605 having gaps 607, 609 formed therein. The gaps 607, 609 divide the segmented portion into three regions, a center portion 611, and first and second outer portions 613, 615. As will become apparent shortly, the center portion 611 serves as the sensor shield 503 in the finished head structure. The gaps 607, 609 are open at a back edge of the shield material layer 601 and terminate at a lap stop location 617, which can be coincident with the intended location of the ABS on the slider. A layer of sensor material 619 is formed above the layer of shield material 601. The sensor 619 is separated from the shield by an insulated gap layer not shown in the perspective view of FIG. 6. This can be seen with review of previously described FIG. 5. First and second electrical lead pads 621, 623 are provided for supplying sense current to the sensor 501 and also for monitoring lapping during fabrication. The pads 621, 623 can be constructed of many electrically conductive materials such as Cu.

A first electrical circuit 625 in the form electrically conductive lead material electrically connects the first pad 621, first outer region 613 and the sensor 619. Similarly, a second electrical circuit 627 electrically connects the second pad 623 with the second outer portion of the shield material layer 615 and the sensor 619. It should be understood that the circuits 625, 627 are depicted schematically and do not represent the actual physical structure of the circuits. The circuits 625, 627 are constructed of an electrically conductive lead material such as Cu and incorporate the leads 513, 511 depicted with reference to FIG. 5. As will be understood by those skilled in the art, the leads can be patterned on top of the gap layer 507, illustrated with reference to FIG. 5, and can be connected to the outer portions 613, 615 of the shield layer 601 through vias formed in the gap layer (not shown in FIG. 6).

To form the ABS of the slider a lapping process is performed in the direction of arrow 629. While the lapping operation is being performed, the resistance between pads 621 and 623 is measured. With reference to FIG. 6 it will be appreciated that the resistance between pads 621 and 623 will be the resistance across the sensor in parallel with the resistance across the shield material layer 601. Since the resistance across the sensor is much higher than the resistance across the shield material layer 601, the resistance measured between the pads will essentially be the resistance across the shield material layer 601. As material is removed from the contiguous portion 603 of the shield material layer 601, the resistance will increase due to the decreased cross section of the contiguous portion 603.

When lapping proceeds to the point that at least one of the gaps 607, 609 is reached (the lap stop location 617) the resistance will increase dramatically since the shield material layer 601 becomes an open circuit and the only current path will be across the sensor 619. Any further lapping will reduce the stripe height of the sensor, thereby increasing the resistance across the sensor even further. Once lapping has proceeded to into the gaps 607, 609, the center portion 611 of the shielding material layer 601 becomes the shield for the finished magnetic head. The outer portions 613, 615 will no longer be connected with the center portion 611 either magnetically or electrically.

Figure 7:
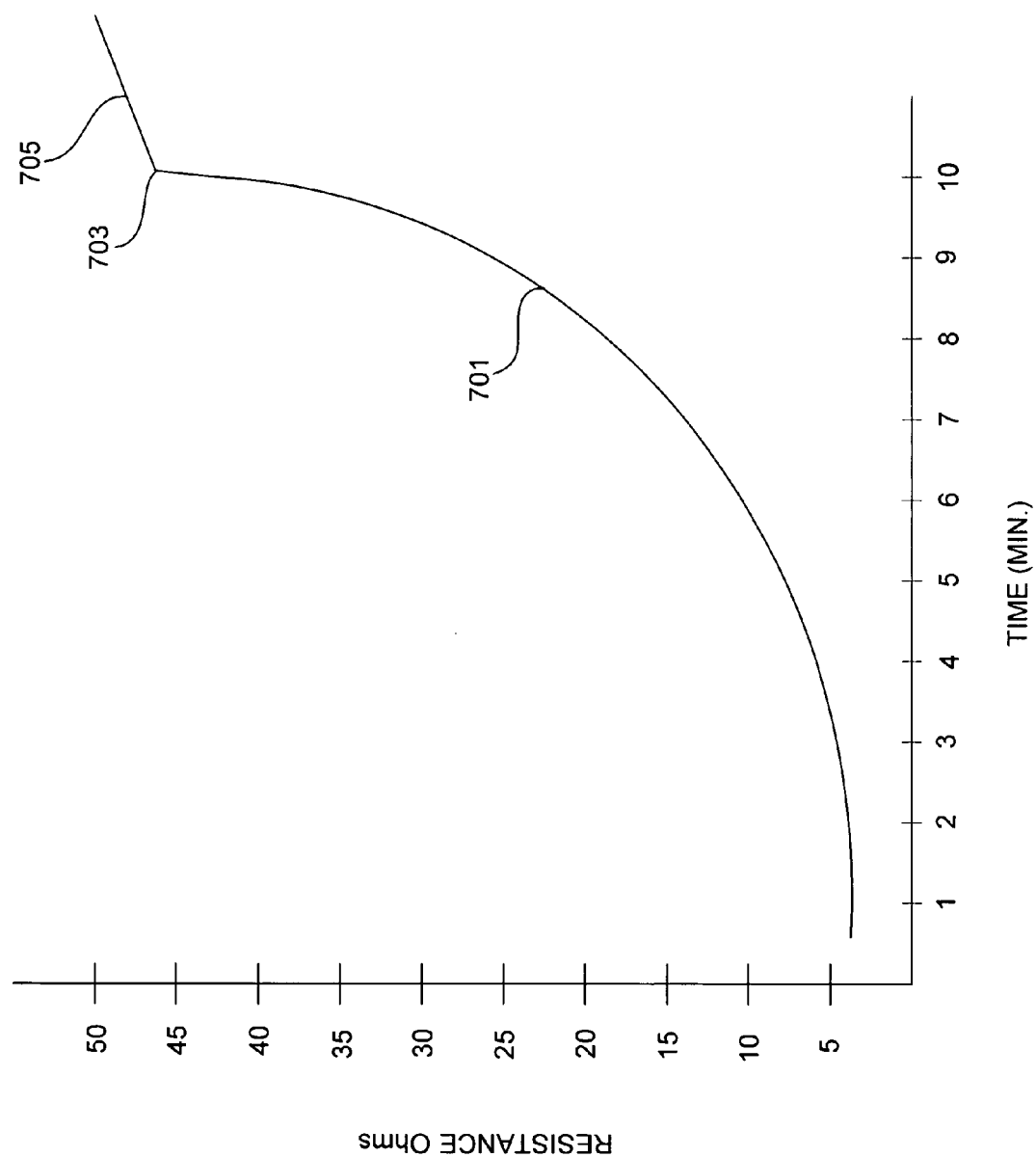
FIG. 7 is a graphical representation the relationship between resistance and lapping time using the embedded ELG of the present invention.

With reference to FIG. 7, the relationship between lapping progress and resistance can be more clearly understood. While the contiguous portion 603 of the magnetic shielding layer 601 is being lapped away, the resistance will increase in a controlled manner as indicated by the curved region 701. A knee in the curve 703 indicates the location where the lapping has reached the terminal point, or lap stop point 617 of at least one of the gaps 607, 609. At this point the resistance will be that of the sensor 619 alone. Further lapping will result in a linear increase in resistance due to the removal of sensor material, and is indicated by the region 705 in the curve of FIG. 7. It will be appreciated the desired location for stopping lapping, (ie. the location of the ABS) can be easily controlled by simply locating the termination of the gaps 607, 609 at the desired lap stop location 617. Therefore, the embedded lapping guide of the present invention can be used to create an embedded sensor (ie. one which is recessed from the ABS), as well as a standard sensor that is exposed at the ABS.

Figure 8:
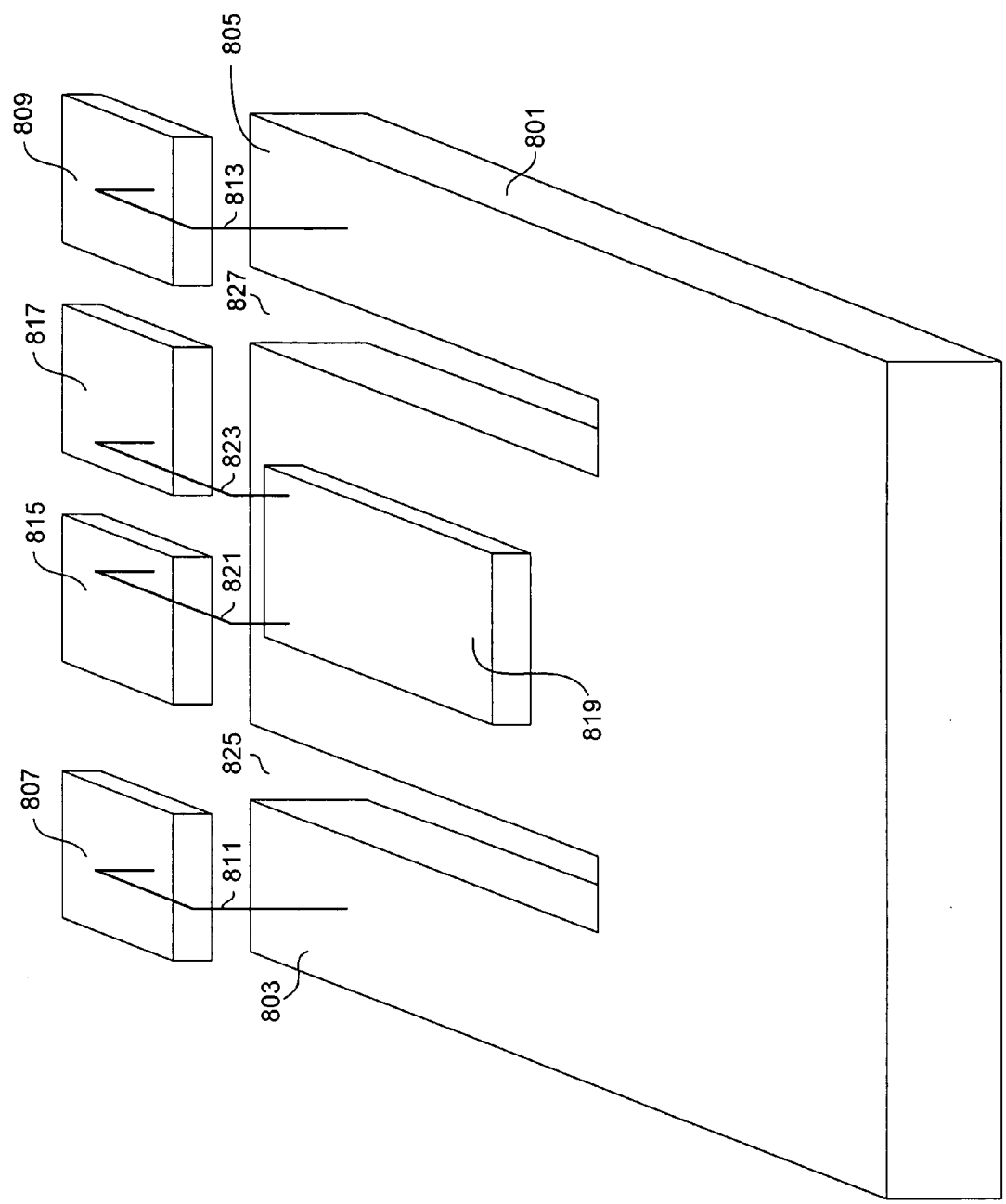
FIG. 8 is an exploded perspective, partial schematic view of an alternate embodiment of an ELG sensor according to an alternate embodiment of the invention.

FIG. 8 illustrates an alternate, but equally applicable embodiment of the present invention. In this embodiment, the shield material layer 801 has first and second outer portions 803, 805 that are connected with ELG pads 807, 809 by first and second ELG leads 811, 813. A separate set of lead pads 815, 817 are electrically connected with the sensor 819 by sensor leads 821, 823, which are not connected with the leads 811, 813. When monitoring lapping using this embodiment, the resistance will increase in a controlled manner while the material is removed from the shield material layer, until at least one of the gaps 825, 827 is reached. At that point the resistance becomes essentially infinite as the lapping guide becomes an open circuit. Further lapping will not result in a resistance change. It will be appreciated by those skilled in the art that the present embodiment of the invention could also be practiced by constructing only one gap 825 in the magnetic shielding layer. Since lapping into that single gap would create an open circuit between the ELG pads 807, 809, such a construction would work equally as well as providing two gaps 825, 827 as shown in FIG. 8.

Figure 9:
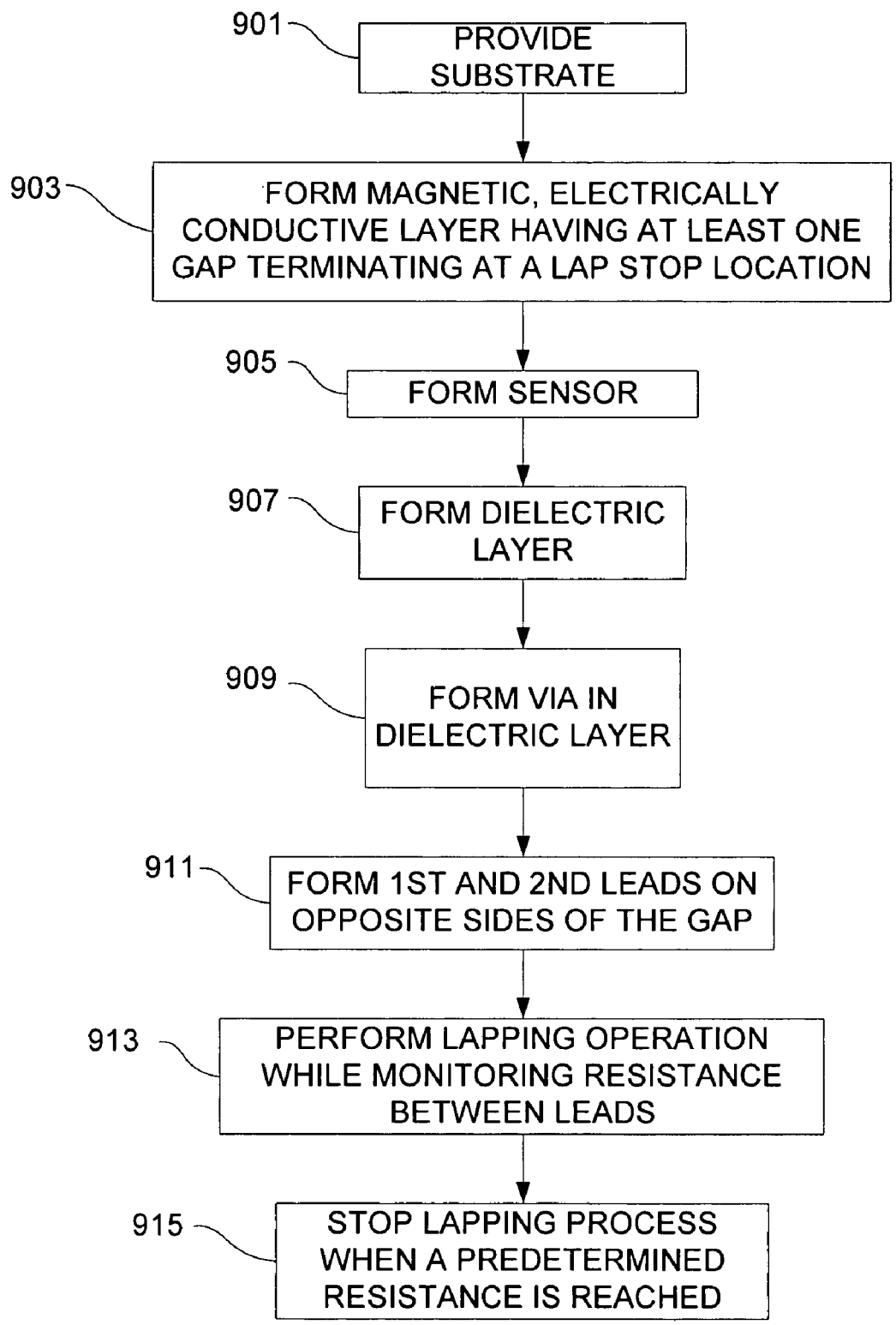
FIG. 9 is a flowchart illustrating a method for manufacturing a magnetic head using an embedded ELG.

With reference to FIG. 9, a process for monitoring lapping of a magnetic head according to the present invention involves providing a substrate 901, then forming a shield material layer over the substrate 903. The shield material layer 903 can be constructed with a single gap terminating at an etch stop location or can include more than one gaps as described above. The process further involves forming a sensor 905, which can be a GMR sensor or some other type of magnetoresistive sensor. The process further includes forming a layer of dielectric material 907 to insulate the sensor from the shield material layer 607 and forming a pair of vias (holes) in the dielectric layer at opposite sides of the gap 909. Leads are formed at opposite side of the gap 911 which extend into the vias to connect with the shield material at opposite sides of the gap. It should be appreciated that the steps set forth need not necessarily be carried out in the order presented herein. For example the present invention contemplates that shield material layer could be constructed as an upper shield (above the sensor) or as a lower shield as shown and described above. While the ELG of the present invention has been described and illustrated using a lower shield using the upper shield would work equally as well. Further, the process includes performing a lapping operation while monitoring resistance across the leads 913, and ceasing lapping when a predetermined resistance is reached 915. The methods used in forming the layers described above will be familiar to those skilled in the art, involving lithographic, depositing and subtractive methods previously used to construct magnetic heads. Few additional steps are required in the formation of the embedded lapping guide of the present invention.

Figure 10:
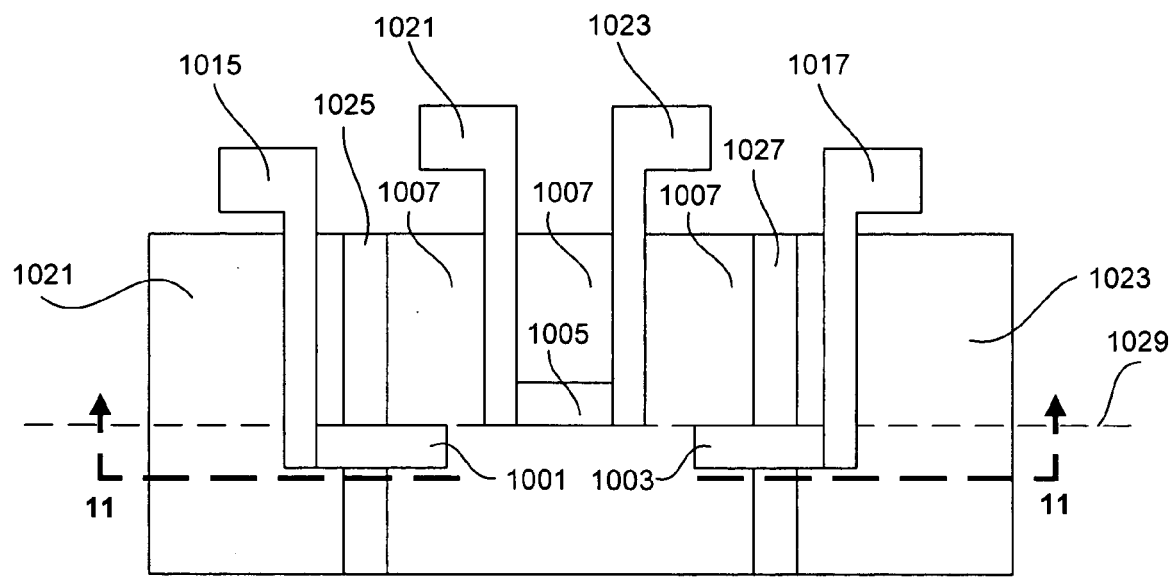
FIGS. 10 and 11 are views of another alternate embodiment of the invention.
Figure 11:
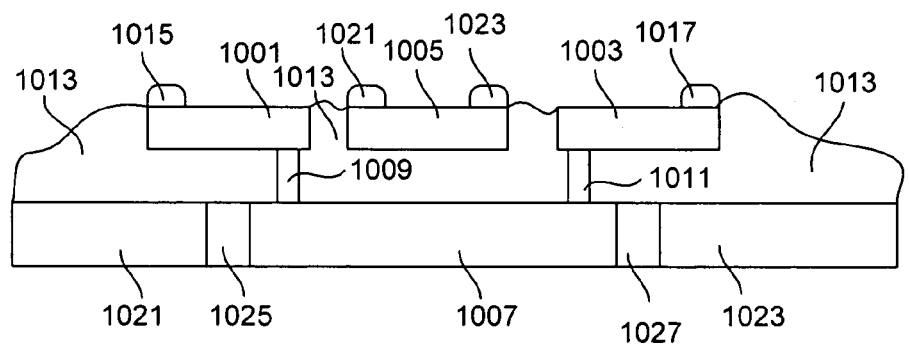

FIGS. 10 and 11 illustrate yet another embodiment of the present invention. According to this embodiment lap guide layers 1001, 1003 are formed in a common deposition step as the sensor 1005. The lap guides 1001, 1003 can, therefore, be formed of the same materials as the sensor 1005. The lap guide layers 1001, 1003 are electrically connected with a shield 1007 through vias 1009, 1011. An insulating material 1013, such as alumina can be used to separate the sensor 1005 and lap guides 1001, 1003 from the shield 1007. Lapping leads 1015, 1017 can be provide to conduct current through the lap guides 1001, 1003 and through the shield 1007 to detect the proper location at which to discontinue lapping. Sensor leads 1021, 1023 can provide sense current to the sensor in the finished product and can be formed in a common manufacturing step as the lapping leads 1015, 1017. Outer shield level portions 1021, 1023 can be formed in a common deposition step with the shield 1007 and can be formed of the same material as the shield. Optionally, the outer portions 1021, 1023 can be formed of another material such as alumina. If formed of an electrically conductive material, such as shield material, the outer portions 1021, 1023 would be separated from the shield 1007, by first and second gaps 1025, 1027 of dielectric material such as alumina. It will be recognized that upon lapping, material will be removed from the lapping guides 1001, 1003. When the lapping reaches the desired ABS level, indicated by line 1029 in FIG. 10, lapping can be terminated.

While various embodiments have been described above, it should be understood that they have been presented by way of example only, and not limitation. Thus, the Breadth and scope of a preferred embodiment should not be limited by any of the above described exemplary embodiments, but should be defined only in accordance with the following claims and their equivalents.

What is claimed is:

1. A method of manufacturing a magnetic head, comprising:

forming a layer of magnetic, electrically conductive material;

forming first and second electrically insulating gaps in said magnetic, electrically conductive material layer said first and second gaps terminating substantially at a predetermined lap stop location, said first and second gaps defining a central portion and first and second laterally opposed outer portions of said magnetic, electrically conductive layer;

forming a magnetoresistive sensor;

forming a first electrically conductive lead connected with said first outer portion of said magnetic, electrically conductive layer;

forming a second electrically conductive lead connected with said second outer portion of said magnetic, electrically conductive layer; and performing a lapping operation until at least one of said first and second gaps is reached.

2. A method as recited in clam 1 further comprising measuring an electrical resistance between said first and second leads until an increase in said resistance indicates that said lap stop location has been reached.

3. A method as recited in claim 1 wherein a portion of said magnetic, electrically conductive layer extending beyond said lap stop location is contiguous.

4. A method as recited in claim 1 wherein said magnetic, electrically conductive layer is formed before the formation of said sensor so as to be formed below said sensor.

5. A method as recited in claim 1 wherein said magnetic, electrically conductive layer is formed after the formation of said sensor so as to be formed above said sensor.

6. A method for constructing a magnetic head, comprising forming a magnetoresistive sensor;

forming a layer of magnetic, electrically conductive material having proximal and distal ends, and first and second lateral side portions;

providing a gap in said layer of magnetic, electrically conductive material, said gap terminating short of said proximal end and extending through said distal end;

performing a lapping operation, said lapping operation initiating from said proximal end and proceeding toward said distal end;

measuring an electrical resistance across said magnetic, electrically conductive layer from said first lateral side portion to said second lateral side portion;

ceasing lapping when said electrical resistance reaches a predetermined value.

7. A method as in claim 6 wherein said layer of magnetoresistive sensor is formed before the formation of said magnetic, electrically conductive material.

8. A method as in claim 6, wherein said layer of magnetoresistive sensor is formed after the formation of said magnetic, electrically conductive material.

9. A method as in claim 6, further comprising depositing a dielectric layer between said sensor and said magnetic, electrically conductive material material.

* * * * *

UNITED STATES PATENT AND TRADEMARK OFFICE
CERTIFICATE OF CORRECTION

| | |
|---|---|
| PATENT NO. | : 7,206,172 B2 |
| APPLICATION NO. | : 10/783290 |
| DATED | : April 17, 2007 |
| INVENTOR(S) | : Meng Ding |

Page 1 of 1

It is certified that error appears in the above-identified patent and that said Letters Patent is hereby corrected as shown below:

In claim 2, column 8, line 17, please replace "clam" with --claim--

Signed and Sealed this

Twenty-seventh Day of July, 2010

David J. Kappos
*Director of the United States Patent and Trademark Office*